(12) United States Patent
Tanaka et al.

(10) Patent No.: US 6,585,363 B1
(45) Date of Patent: *Jul. 1, 2003

(54) INK-JET PRINTING APPARATUS AND PRINTING METHOD

(75) Inventors: Hideki Tanaka, Yokohama (JP); Shinji Takagi, Kawasaki (JP); Hiroyuki Hyotani, Kawasaki (JP); Takehiko Kasamatsu, Fujisawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/795,635

(22) Filed: Feb. 6, 1997

(30) Foreign Application Priority Data

Feb. 9, 1996 (JP) .............................. 8-024509
Feb. 4, 1997 (JP) .............................. 9-021787

(51) Int. Cl.⁷ ............................ B41J 2/17; B41J 2/01
(52) U.S. Cl. ............................ 347/96; 347/101
(58) Field of Search ................... 347/15, 96, 98, 347/100

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,538,160 A | 8/1985 | Uchiyama |
| 4,558,333 A | 12/1985 | Sugitani et al. |
| 4,608,577 A | 8/1986 | Hori |
| 4,723,129 A | 2/1988 | Endo et al. |
| 4,740,796 A | 4/1988 | Endo et al. |
| 5,093,903 A | * 3/1992 | Sudoh et al. ............. 395/102 |
| 5,208,605 A | * 5/1993 | Drake ..................... 347/15 |
| 5,327,166 A | * 7/1994 | Shimada .................. 347/183 |
| 5,574,832 A | * 11/1996 | Towery et al. ........... 395/109 |
| 5,624,484 A | * 4/1997 | Takahashi et al. ....... 106/31.75 |
| 5,635,969 A | * 6/1997 | Allen ..................... 347/96 |
| 5,742,300 A | * 4/1998 | Klassen .................. 347/9 |

FOREIGN PATENT DOCUMENTS

| | | |
|---|---|---|
| EP | 0 622 758 | 11/1994 |
| EP | 0 657 849 | 6/1995 |
| JP | 54-56847 | 5/1979 |
| JP | 58-128862 | 8/1983 |
| JP | 59-123670 | 7/1984 |
| JP | 59-138461 | 8/1984 |
| JP | 60-71260 | 4/1985 |
| JP | 5-202328 | 8/1993 |

* cited by examiner

*Primary Examiner*—John Barlow
*Assistant Examiner*—Michael S Brooke
(74) *Attorney, Agent, or Firm*—Fitzpatrick, Cella, Harper & Scinto

(57) ABSTRACT

In order to deposit a liquid for improving fixing ability and water resistance of an ink at an optimal position in an appropriate amount, to maximize an effect of the liquid, and to easily generate a driving data for ejecting the liquid, low resolution printing data for respective of four printing heads is read out from a frame memory. A logical sum of the printing data is calculated by an OR circuit. Then, the logical sum is processed by a look-up table to generate the driving data for the liquid ejecting head corresponding to high resolution.

34 Claims, 12 Drawing Sheets

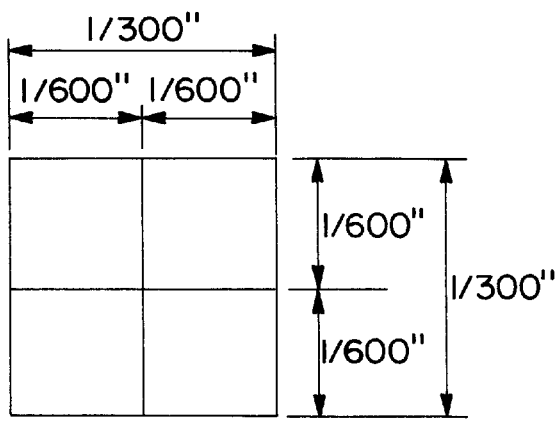
FIG. 4A (00)
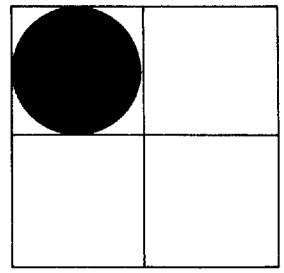
FIG. 4B (01)
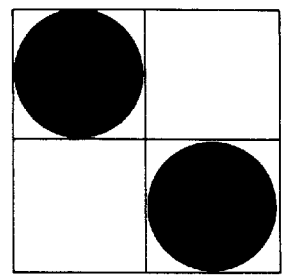
FIG. 4C (10)
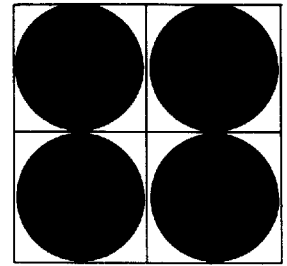
FIG. 4D (11)

FIG. 11A (00) 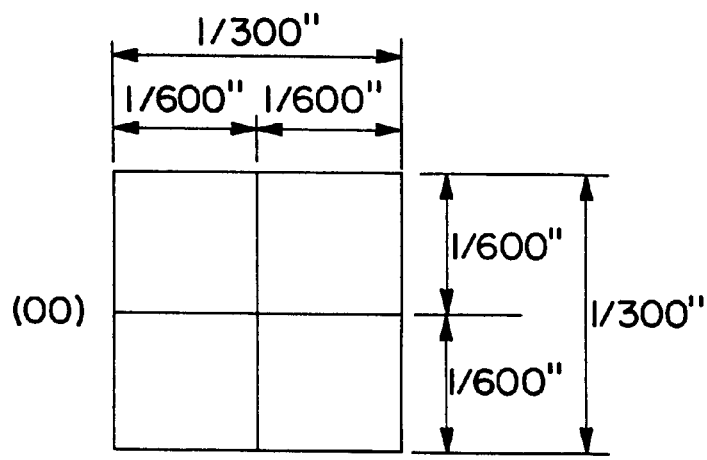
FIG. 11B (01) 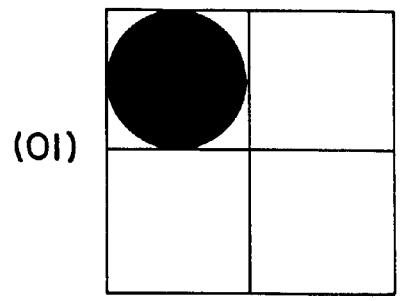
FIG. 11C (10) 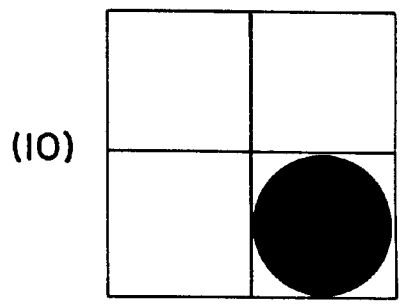
FIG. 11D (11) 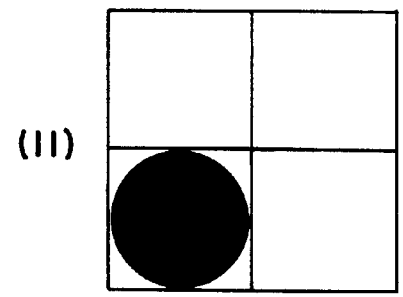

INK-JET PRINTING APPARATUS AND PRINTING METHOD

BACKGROUND OF THE INVENTION

1. Field of the Invention

The present invention relates generally to an ink-jet printing apparatus and a printing method. More specifically, the invention relates to an ink-jet printing apparatus and a printing method, in which a liquid for making a coloring material in an ink on a printing medium insoluble before or after formation of printing dots on the printing medium by ejecting the ink from a printing head.

2. Description of the Related Art

Conventionally, upon printing on a printing medium, such as a plain paper by an ink-jet printing system, it is possible to degrade a quality of a printed image due to influence of bluing of ink or so forth. On the other hand, due to insufficiency of water resistance, durability of the printed image can be low.

As a solution for such problem, Japanese Patent Application Laid-open No. 58-128862 discloses a technology for forming liquid dots (hereinafter referred to as processing liquid dots) by ejecting a liquid (hereinafter referred to as a processing liquid) having an effect for suitably fixing a printing ink before or after ejection of the printing ink and thus overlaying the processing liquid dots and printing dots. On the other hand, Japanese Patent Application Laid-open No. 64-63185 discloses a technology for forming printing dots on a printing medium by ejecting the printing ink after depositing a compound which makes the dye in the ink insoluble. Furthermore, Japanese Patent Application Laid-open No. 5-202328 discloses the following three printing methods. The first method performs deposition of a processing liquid for suitably fixing and providing water resistance for the printing ink by an ink-jet system, in advance of an operation for forming printing dots on the printing medium. The second method is a method for depositing a liquid (hereinafter referred to as a processing liquid) on the printing medium by roller application. The third method is a method for improving water resistance and fixing ability of the printing ink by depositing the printing medium by mixing the printing ink and the processing liquid during flying from an ejecting head.

In the prior art set forth above, the processing liquid is deposited for all of the printing dot forming positions on the printing medium, it may consume unnecessarily large amount of the processing liquid. Particularly, in case of color printing using a plurality of colors, admixing of colors due to excessive amount of the processing liquid can be caused.

SUMMARY OF THE INVENTION

It is an object of the present invention to provide an ink-jet printing apparatus and a printing method, which can deposit appropriate amount of a liquid at optimum positions on a printing medium, obtain maximum performance of the liquid, and easily generate a driving data for ejecting the liquid.

In a first aspect of the present invention, there is provided an ink-jet printing apparatus using a printing head which can eject an ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, comprising:

converting means for converting a relatively low resolution printing data into a printing data having a resolution higher than that of the data;

first control means for effecting ejection of the ink from the printing head on the basis of the converted high resolution printing data;

driving data generating means for generating a driving data for the liquid ejecting head on the basis of the high resolution printing data; and second control means for effecting ejection of the liquid from the liquid ejecting head on the basis of the driving data.

In a second aspect of the present invention, there is provided an ink-jet printing apparatus using a printing head which can eject an ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, comprising:

first converting means for converting a relatively low resolution printing data into a printing data having a resolution higher than that of the data;

first control means for effecting ejection of the ink from the printing head on the basis of the converted high resolution printing data;

second converting means for converting the low resolution printing data into a driving data for the liquid ejecting head; and second control means for effecting ejection of the liquid from the liquid ejecting head on the basis of the driving data.

In a third aspect of the present invention, there is provided an ink-jet printing method using a printing head which can eject an ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, comprising the steps of:

converting a relatively low resolution printing data into a printing data having a resolution higher than that of the data;

effecting ejection of the ink from the printing head on the basis of the converted high resolution printing data;

generating a driving data for the liquid ejecting head on the basis of the high resolution printing data; and effecting ejection of the liquid from the liquid ejecting head on the basis of the driving data.

In a fourth aspect of the present invention, there is provided an ink-jet printing method using a printing head which can eject an ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, comprising the steps of:

converting a relatively low resolution printing data into a printing data having a resolution higher than that of the data;

effecting ejection of the ink from the printing head on the basis of the converted high resolution printing data;

converting the low resolution printing data into a driving data for the liquid ejecting head; and effecting ejection of the liquid from the liquid ejecting head on the basis of the driving data.

The present invention generates the driving data for ejecting the liquid for improving fixing ability and water resistance of the ink on the basis of low resolution printing data or high resolution printing data. Then, by ejecting the liquid on the basis of the driving data, maximum performance of the liquid can be obtained. Furthermore, the driving data for ejecting the liquid can be easily obtained.

Further, the present invention generates the driving data for ejecting the liquid on the basis of low resolution printing data, reducing a processing time for generating the driving data, coping with a case where the number of ejection openings is increased.

The above and other objects, effects, features and advantages of the present invention will become more apparent from the following description of embodiments thereof taken in conjunction with the accompanying drawings.

BRIEF DESCRIPTION OF THE DRAWINGS

In the drawings:

FIGS. 4A, 4B, 4C and 4D are explanatory illustrations showing relationship between printing data read from the frame memory of FIG. 2 and the printing dots;

FIGS. 11A, 11B, 11C and 11D are explanatory illustration showing a relationship between output data of an OR gate of FIG. 9 and processing liquid dot.

DESCRIPTION OF THE PREFERRED EMBODIMENT

First Embodiment

Figure 1:
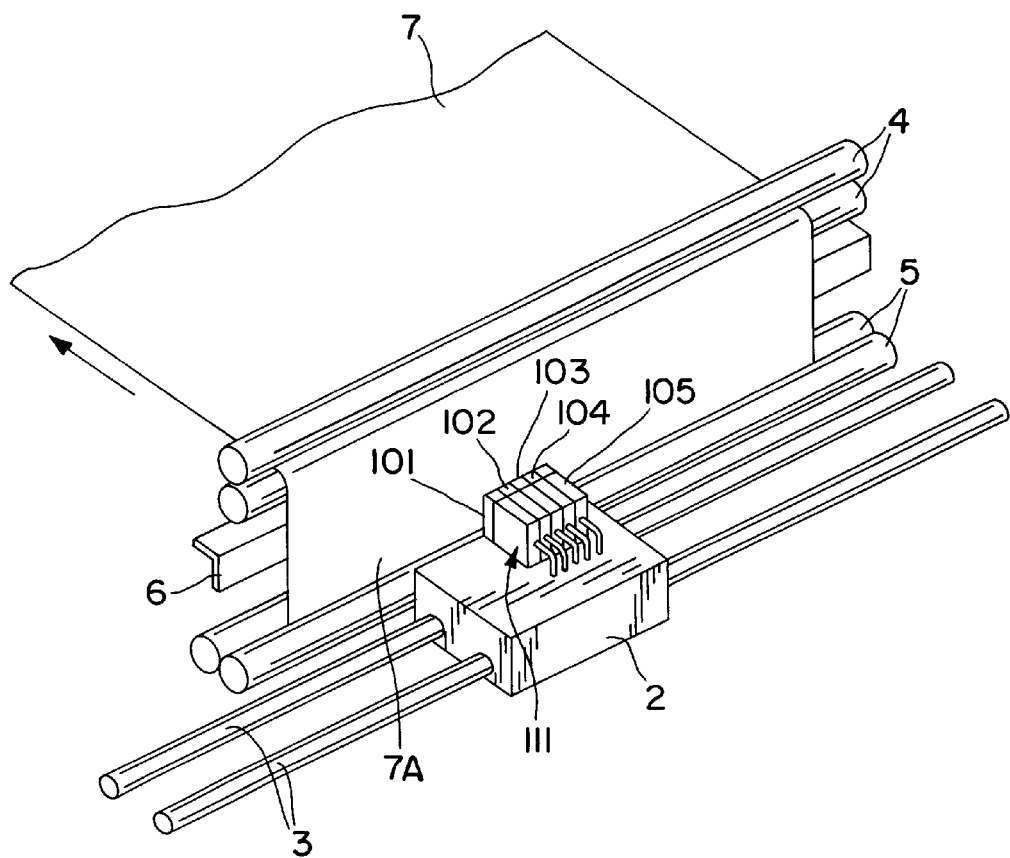
FIG. 1 is a generally perspective view of the major part of the first embodiment of an ink-jet printer according to the present invention.

The first embodiment is an application of the present invention for a color ink-jet printer, and FIG. 1 is a general perspective view of the major part thereof.

In FIG. 1, the reference numeral 111 denotes a head assembly, in which printing heads 101, 102, 103 and 104 and a liquid ejecting head (hereinafter referred to as a processing liquid ejecting head) 105 are provided, as discussed later. Each of these heads 101 to 105 is provided 64 ejection openings, for example, aligned in feeding direction of a printing medium 7 on a surface opposing to the printing medium, such as a printing paper or so forth. On the other hand, in the printing heads 101 to 104, ink passages communicated with respective of 64 ejection openings are provided. Corresponding to respective ink passages, electrothermal transducers generating thermal energy for ejecting an ink are formed on a substrate forming respective heads 101 to 104. Similarly, in the processing liquid ejecting head 105, liquid passages (hereinafter referred to as processing liquid passages) communicated with respective of 64 ejection openings are provided. Corresponding to respective processing liquid passages, electrothermal transducers generating thermal energy for ejecting a liquid (hereinafter referred to as a processing liquid) are formed on a substrate forming head 105. The electrothermal transducers generate heat by electric pulses applied depending upon a printing data to cause film boiling in the ink or the processing liquid for ejecting the ink or the processing liquid through the ejection openings associating with generation of bubble by film boiling. In each of the heads 101 to 105, a common liquid chamber commonly communicated with respective ink passages or processing liquid passages is provided. Depending upon ejecting operation from ejection openings, the ink or the processing liquid stored in the common liquid chamber is supplied to the ink passages or the processing liquid passages communicated with the ejection openings.

The head assembly 111 is mounted on a carriage 2. The carriage 2 is slidably guided along a pair of guide rails 3 extending in parallel to a printing surface 7A of a printing medium 7. Thereby the head assembly 111 may perform primary scan along the guide rail 3. Associating with the primary scan, printing is performed by ejecting the ink or the processing liquid from heads 101 to 105 at a timing set out later. After primary scan of the head assembly 111, the printing medium 7 is fed in an auxiliary scanning direction shown by arrow in a predetermined amount, and then printing operation is performed with scanning the head assembly 111 in the primary scanning direction. By repeating such operation, printing is performed sequentially on the printing surface 7A of the printing medium 7.

Feeding of the printing medium 7 is performed by rotating a pair of transporting rollers 4 and 5. On the other hand, on the backside of the printing surface 7A of the printing medium 7, a platen 6 is arranged for maintaining flatness of the printing surface 7A.

It should be noted that motion of the carriage 2 can be performed by driving a not shown belt connected to the carriage by means of a motor. Similarly, rotation of the transporting rollers 4 and 5 can be performed by means of motor.

Figure 2:
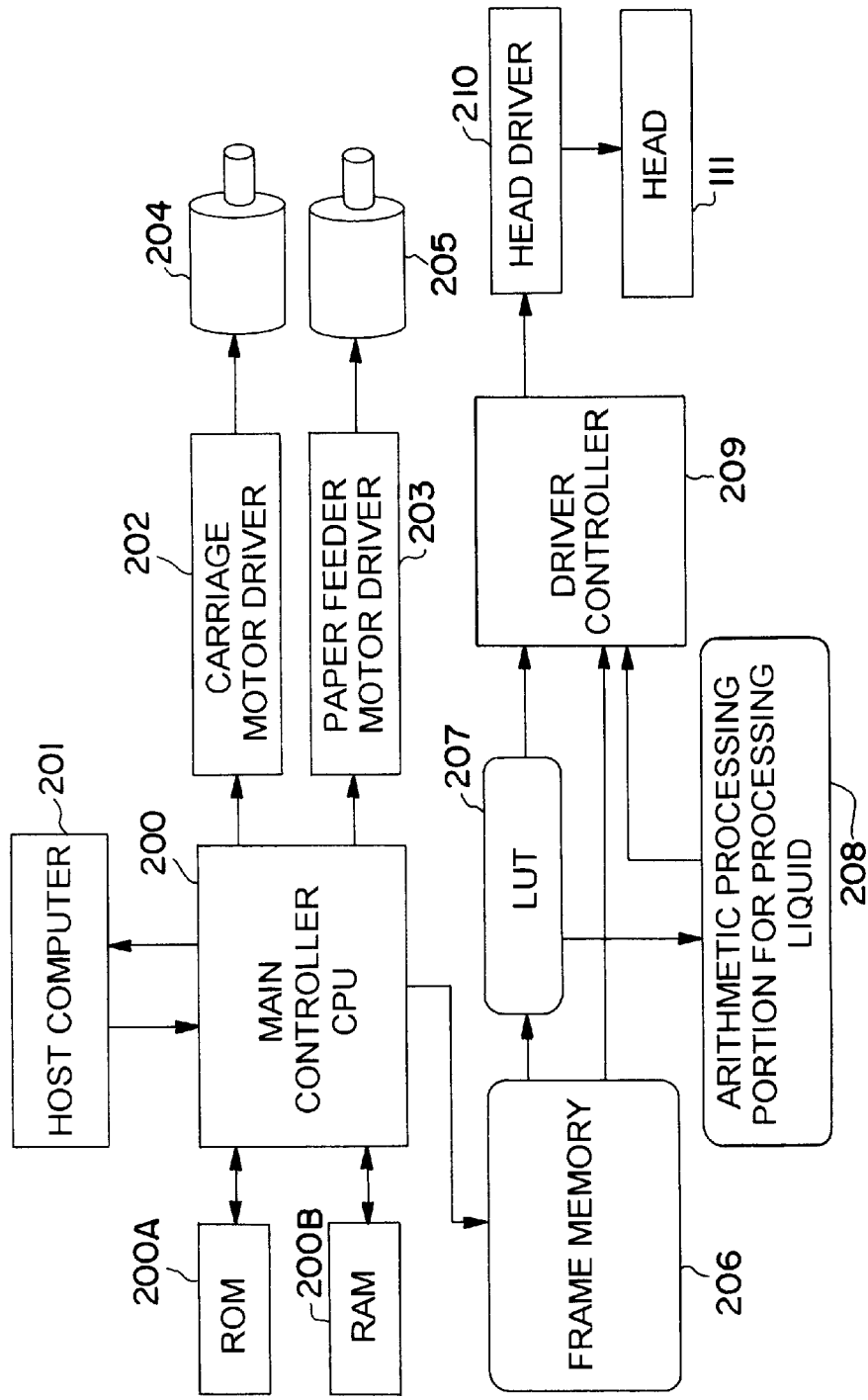
FIG. 2 is a block diagram showing a control system in the ink-jet printer of FIG. 1.

FIG. 2 is a block diagram showing a construction of a control system in the printer shown in FIG. 1.

In FIG. 2, a CPU (control processing unit) 200 as a main controller executes control process and data processing and so forth for operating respective portions of the apparatus, including control process for forming printing dots and processing liquid dots. In a ROM (read only memory) 200A, a processing procedure is stored. On the other hand, in a RAM (random access memory) 200B, a work area for execution of the process is provided. To the CPU 200, low resolution printing data corresponding to the printing heads 101, 102, 103 and 104 are transferred from a host computer 201. The low resolution printing data for printing in one primary scan of the head assembly 111 is stored in a frame memory 206. The stored printing data is converted into a high resolution printing data by a LUT (look-up table) 207 for generating driving data for respective of the printing heads 101, 102, 103 and 104 as discussed later. Then, on the basis of the driving data, a driver controller 209 controls driving of the printing heads 101, 102, 103 and 104 of the head assembly 111 via a head driver 210. Resolution of the printing data will be discussed later. An arithmetic processing portion 208 for the processing liquid generates a driving data for the processing liquid ejecting head 105 from the high resolution printing data converted by the LUT 207. On the basis of the driving data, the driver controller 209 controls driving of the processing liquid ejecting head 105 of the head assembly 111 via the head driver 210. The CPU 200 controls a carriage motor 204 for moving the carriage 2 and a paper feeder (PF) motor 205 for rotatingly driving the transporting rollers 4 and 5, via a carriage motor driver 202 and a paper feeder motor driver 203.

Figure 3:
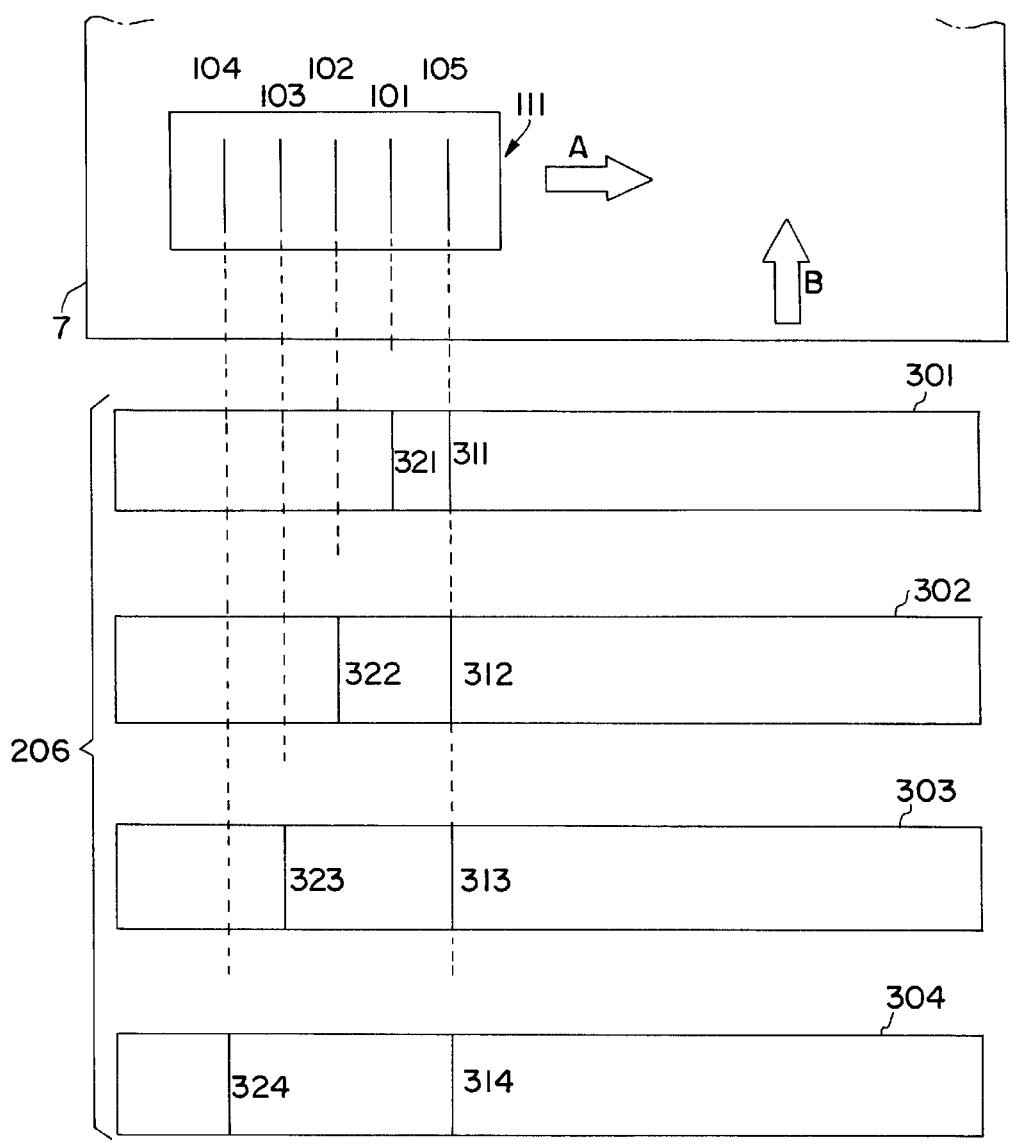
FIG. 3 is an explanatory illustration showing a relationship between a printing data read out from a frame memory of FIG. 2 and a scanning position of the head.

FIG. 3 is an explanatory illustration showing a relationship between the head assembly 111 and the printing medium 71 and the frame memory 206. The reference numeral 101 denotes the printing head for ejecting an ink of black (K), 102 denotes the printing head for ejecting an ink of cyan (C), 103 denotes the printing head for ejecting an ink of magenta (M) and 104 denotes the printing head for ejecting an ink of yellow (Y). On the other hand, the reference numeral 105 denotes the processing liquid ejecting head for ejecting the processing liquid for making the dyestuff as coloring element in the ink insoluble. In FIG. 3, a plurality of ejection openings of each of the heads 101 to 105 aligned in vertical direction in FIG. 3 are illustrated by straight line. An arrow A represents the primary scanning direction for moving the head assembly 111, and an arrow B represents an auxiliary scanning direction for feeding the printing medium 7. On the other hand, compositions of the inks and the processing liquid will be discussed later. It should be noted that in case of a printer which performs printing with a single color ink, the printing head 101 for ejecting the ink of black color, for example and the processing liquid ejecting head 105 may be provided.

Upon printing of an image, the head assembly 111 is primarily scanned in the direction of arrow A while ejecting the inks of respective colors and the processing liquid through the heads 101 to 105. In the shown embodiment, the processing liquid ejecting head 105 is positioned at the front side in the primary scanning direction. After ejecting the processing liquid from the head 105, the inks of respective colors are ejected from the printing heads 101, 102, 103 and 104. Namely, after formation of the processing liquid dots by depositing the processing liquid on the printing surface 7A, the inks of respective colors of inks are ejected for forming the printing dots and whereby forming the image. It should be noted that it is also possible to form the processing liquid dots by ejecting the processing liquid after formation of the printing dots.

In FIG. 3, the reference numerals 301 to 304 represent printing data in the frame memory 206 upon printing, and these printing data 301 to 304 are corresponding to the physical position of the printing paper 7. The printing data 301 is the printing data for the printing head 101, namely the printing data for black ink, and is read out sequentially corresponding to movement of the head assembly 111 in the primary scanning direction A. Similarly, the printing data 302 to 304 are printing data for cyan, magenta and yellow inks, and are read out sequentially corresponding to movement of the head assembly 111 in the primary scanning direction A. Namely, as shown in FIG. 3, data 321, 322, 323 and 324 are corresponding to the scanning position of the head assembly 111 on the printing medium 7. Then, on the basis of these data 321 to 324, driving of the printing head 101 to 104 is controlled for performing printing, such as character printing or so forth. On the other hand, as the data corresponding to the processing liquid ejecting head 105, is read out simultaneously with respective of data 311, 312, 313 and 314 for respective colors at the scanning position of the processing liquid ejecting head 105. Then, on the basis of these data 311 to 314, driving of the processing liquid ejecting head 105 is controlled.

Next, discussion will be given for ejection control of the ink and the processing liquid.

Figure 5:
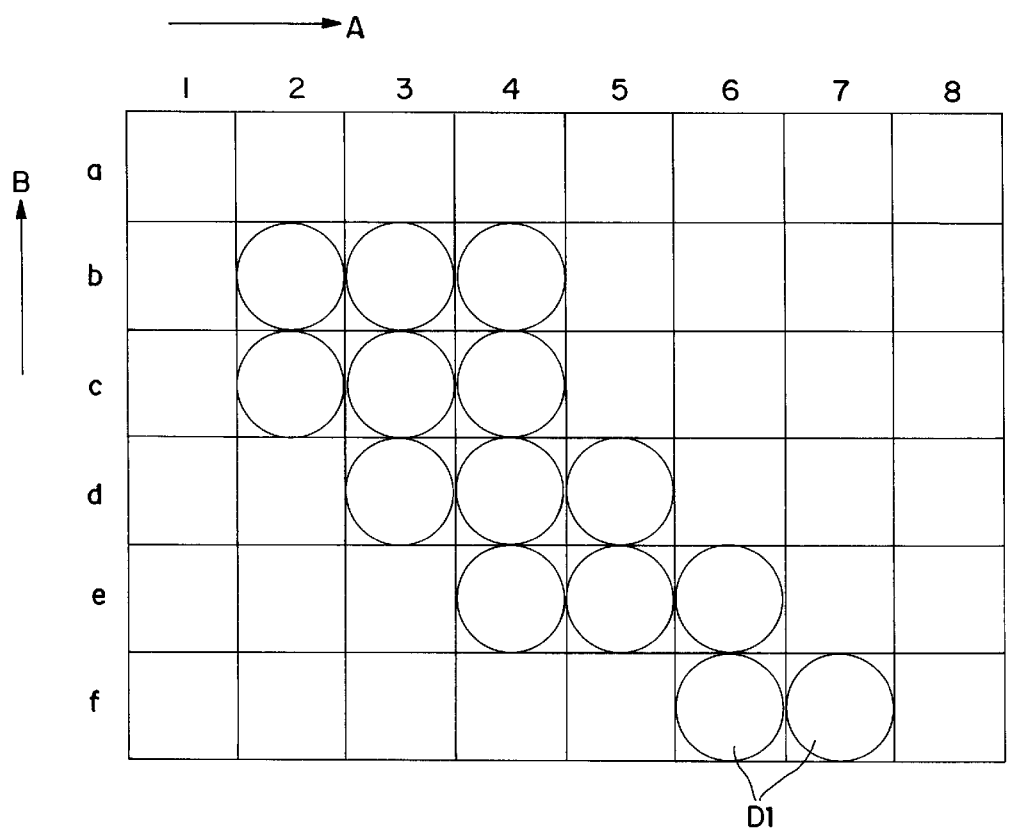
FIG. 5 is an explanatory illustration showing an example of printing dot formed by a head of FIG. 2.

FIG. 5 is an explanatory illustration showing a relationship between the printing data and the printing dot D1 formed on the printing medium 7. In the shown embodiment, the printing data is derived as a logical sum of the printing data respectively corresponding to inks of respective colors of CMYK (cyan, magenta, yellow and black), in which the position of the printing dot D1 to be formed by at least one of these inks are expressed by a mark ○. Columns 1 to 8 in FIG. 5 represent printing positions in the primary scanning direction A, and a to f represent printing positions in the auxiliary scanning direction B.

Figure 6:
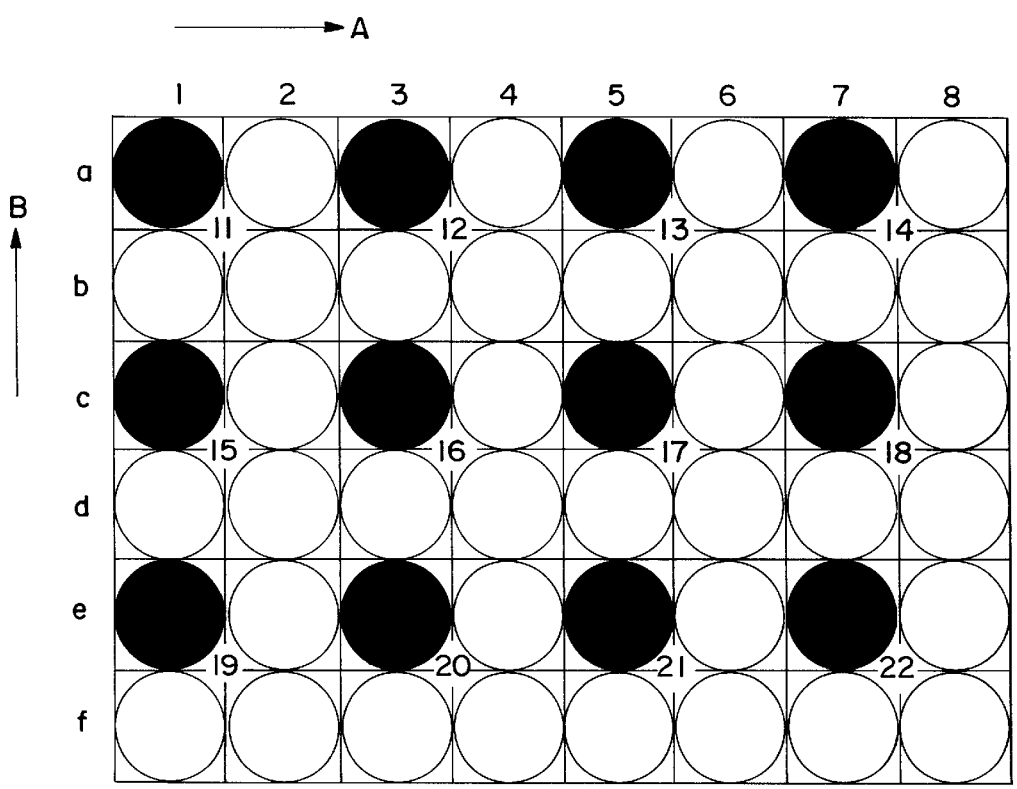
FIG. 6 is an explanatory illustration showing a process content of a processing liquid an arithmetic processing portion for a treatment liquid of FIG. 2.

FIG. 6 is an explanatory illustration showing a method for setting judgment regions with respect to the printing data of FIG. 5 as shown by 11 to 22 in the drawing. In the shown embodiment, the judgment regions define small regions corresponding to 2 dots×2 dots. When a printing data for forming the printing dot D1 of ○ mark as shown in FIG. 5 is present at one position of ● mark in each small region, the printing dot D1 is formed after forming the processing liquid dot D2. Namely, with respect to the printing data, by mask pattern processing of 2 dots×2 dots in a form shown in FIG. 5, the driving data for the processing liquid ejecting head 105 is generated. For example, with respect to the region 16, since the printing data of the printing dot D1 at a coordinates (3, c) in FIG. 5 is present, and, ● mark is located at the position of the coordinates (3, c), the processing liquid is ejected to the position of ● mark in the region 16 by forming the processing liquid dot D2. Namely, in the shown embodiment, the driving data for the processing liquid ejecting head 105 is established at about 25% of a printing data derived as logical sum of the printing data corresponding to respective colors of inks. Namely, by thinning the printing data, the driving data of the processing liquid ejecting head 105 is established. On the basis of the driving data, the processing liquid is ejected. When the processing liquid and the inks are provided the following composition, in order to obtain sufficient effect of the processing liquid, the ejection amount of the processing liquid in the extent set forth above can be confirmed by experiments. In such case, the processing liquid ejecting head 105 used the same construction as those of the printing heads 101 to 104, and the ejection amounts of the ink and the processing liquid through respective ejection openings are the same.

Figure 7:
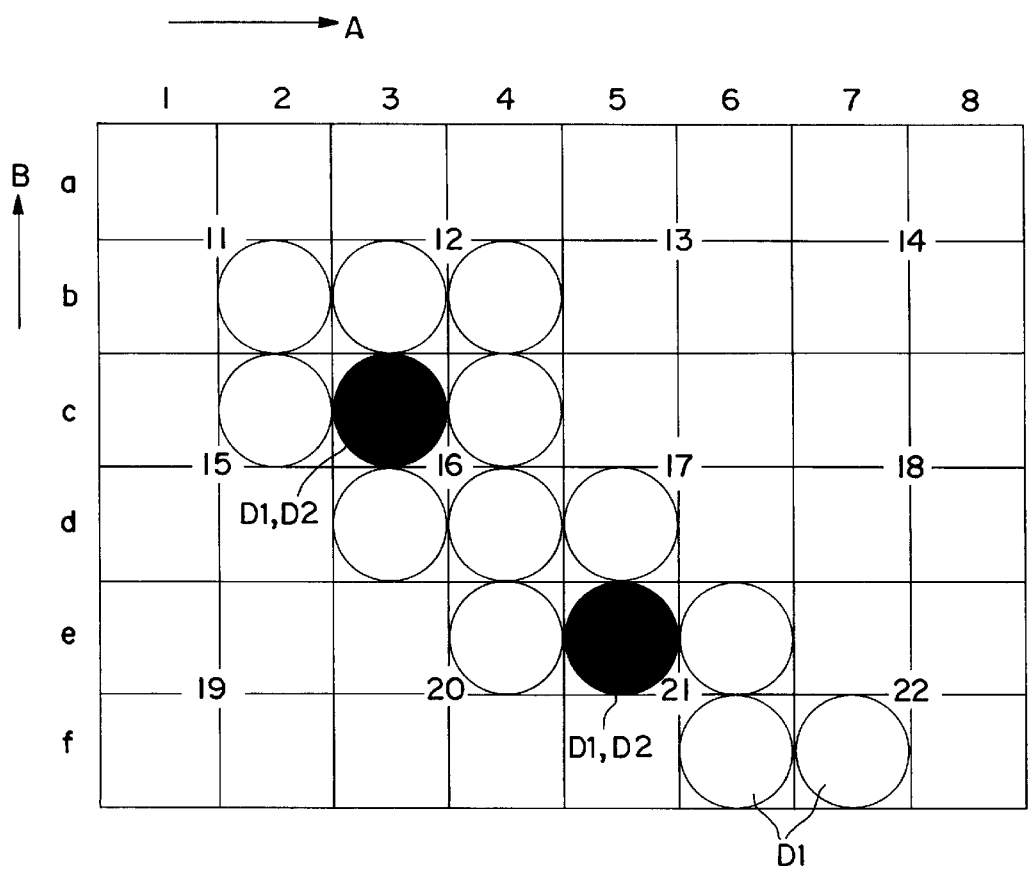
FIG. 7 is an explanatory illustration showing an example of processing liquid dot formed by the head of FIG. 2.

FIG. 7 is an illustration showing positions of the processing liquid dots actually formed on the printing medium 7 by the mask pattern process of FIG. 6 with respect to the printing data of FIG. 5.

It should be noted that the judgment region is not limited to 2 dots×2 dots but can be set arbitrarily depending upon ejection amount of the processing liquid as long as an area on the printing medium 7 where one processing liquid dot D2 is effective; can be certainly defined.

On the other hand, recently, associating increasing of density in the construction of the head assembly 111, a capacity of the frame memory 206 is increasing to be large capacity. Therefore, particularly upon printing of a photo grade image or so forth, a low resolution multi-tone printing data is stored in the frame memory 206. It is preferred that the capacity of the frame memory 206 is set to be smaller than a capacity of actual printing resolution (hereinafter also referred to as high resolution) of the printing heads 101 to 105. In this case, printing is performed with converting the low resolution image data of the frame memory 206 into the high resolution image data in real time by employing the LUT 207.

Here, discussion will be given for a method for printing by converting the low resolution image data into the high resolution image data, with reference to FIGS. 2 and 4A to 4D.

The LUT 207 of FIG. 2 is adapted to input the low resolution image data of 300 DPI (dot/inch), as 2 bit data and output the high resolution image data of 600 DPI, as 1 bit data, for example. Namely, in the shown embodiment, the heads 101 to 105 has resolution of 600 DPI in the auxiliary scanning direction. On the other hand, printing at the resolution of 600 DPI is also possible in the primary scanning direction.

FIGS. 4A to 4D show relationship between an input image data value of 300 DPI, as 2 bit data and actual four pixels of image of 600 DPI corresponding to the input image data. FIG. 4A shows that respective of four pixels of 600 DPI are not formed when respective bits of the 2 bit input image data is (00). FIG. 4B shows that one pixel out of four pixels of 600 DPI is formed when respective bits of the 2 bit input image data is (01). FIG. 4C shows that two pixels out of four pixels of 600 DPI are formed when respective bits of the 2 bit input image data is (10). FIG. 4D shows that all of four pixels of 600 DPI are formed when respective bits of the 2 bit input image data is (11). As illustrated in FIGS. 4A to 4D, by performing the process for converting the low resolution input image data into the high resolution output image data in real time associated with printing operation, reduction of the capacity of the frame memory 206 can be achieved. Assuming that each one bit is assigned for all of four pixels of 300 DPI, it becomes necessary to store 4 bit data for four pixels. In contrast to this, by performing conversion process as shown in FIGS. 4A to 4D, four pixels can be expressed by 2 bit data. Accordingly, by performing the conversion process as shown in FIGS. 4A to 4D, the storage data amount of the frame memory 206 becomes half to correspondingly permit reduction of the capacity of the frame memory.

In the meanwhile the resolution converting process for converting such low resolution printing data into the high resolution printing data can be performed before or after thinning process of the printing data for generating the driving data of the treatment liquid ejecting head 105. For instance, the driving data for the treatment liquid ejecting head 105 can be generated by performing thinning process of the low resolution printing data in advance of resolution conversion process, and then performing conversion into the high resolution printing data. In the alternative, the driving data for the treatment liquid ejecting head 105 can be generated by performing thinning process of the high resolution printing data after resolution conversion.

On the other hand, when respective printing data for respective colors of inks of CMYK are low resolution printing data, the driving data for the treatment liquid ejecting head 105 can be generated by modifying the order of the resolution conversion process for conversion into the high resolution printing data, the thinning process and the logical sum calculating process in various ways. For example, the driving data for the treatment liquid ejecting head 105 may be generated by initially performing resolution conversion process for converting the low resolution printing data for CMYK into high resolution printing data, then performing thinning process for the high resolution data, and subsequently performing calculation of the logical sum of those printing data. Also, the driving data for the treatment liquid ejecting head 105 may be generated by initially performing resolution conversion for converting the low resolution printing data for CMYK into high resolution printing data, then performing calculation of the logical sum of those printing data, and thereafter performing thinning process. Furthermore, the driving data for the treatment liquid ejecting head 105 may also be generated by initially performing thinning process for the low resolution printing data for CMYK, then performing calculation of the logical sum of those printing data, and thereafter performing resolution conversion process for conversion into the high resolution printing data.

Second Embodiment

In the case of the foregoing first embodiment, reduction of the capacity of the frame memory 206 is achieved by reading out the low resolution image data in real time and converting the low resolution image data into the high resolution image data utilizing the LUT 207, depending upon the scanning position of the head assembly 111. On the other hand, by generating the driving data for the processing liquid ejecting head 105 in real time, the capacity of the frame memory 206 can be reduced.

Also, in the foregoing first embodiment, the input image data to be objects for conversion process by the LUT 207 as shown in FIGS. 4A to 4D (hereinafter also referred to as "LUT process"), becomes two data for respective of four colors of inks and thus eight data in total. Namely, at first, depending upon scanning positions of respective printing heads 101 to 104, four input image data for respective ink colors are processed by LUT process in real time to generate the output image data for respective printing heads 101 to 104. Also, separately from the foregoing LUT process, depending upon the scanning position of the processing liquid ejecting head 105, the four input image data for respective ink colors are processed by LUT process in real time. Then, the driving data for the processing liquid ejecting head 105 is generated by performing a mask pattern process of FIG. 6 after calculating a logical sum (see FIG. 5) the results of respective LUT processes. Accordingly, when objective data of LUT process becomes eight, such eight LUT processes should not create significant problem as long as number of the ejection opening in the heads 101 to 105 is small. However, when the number of the ejection openings is increased associating with speeding up of the printing apparatus, it may become difficult to execute eight LUT processes in synchronism with printing operation.

Therefore, the shown embodiment is adapted to generate the driving data for the processing liquid ejection head 105 easier. The discussion will be given with respect to the shown embodiment hereinafter.

Figure 8:
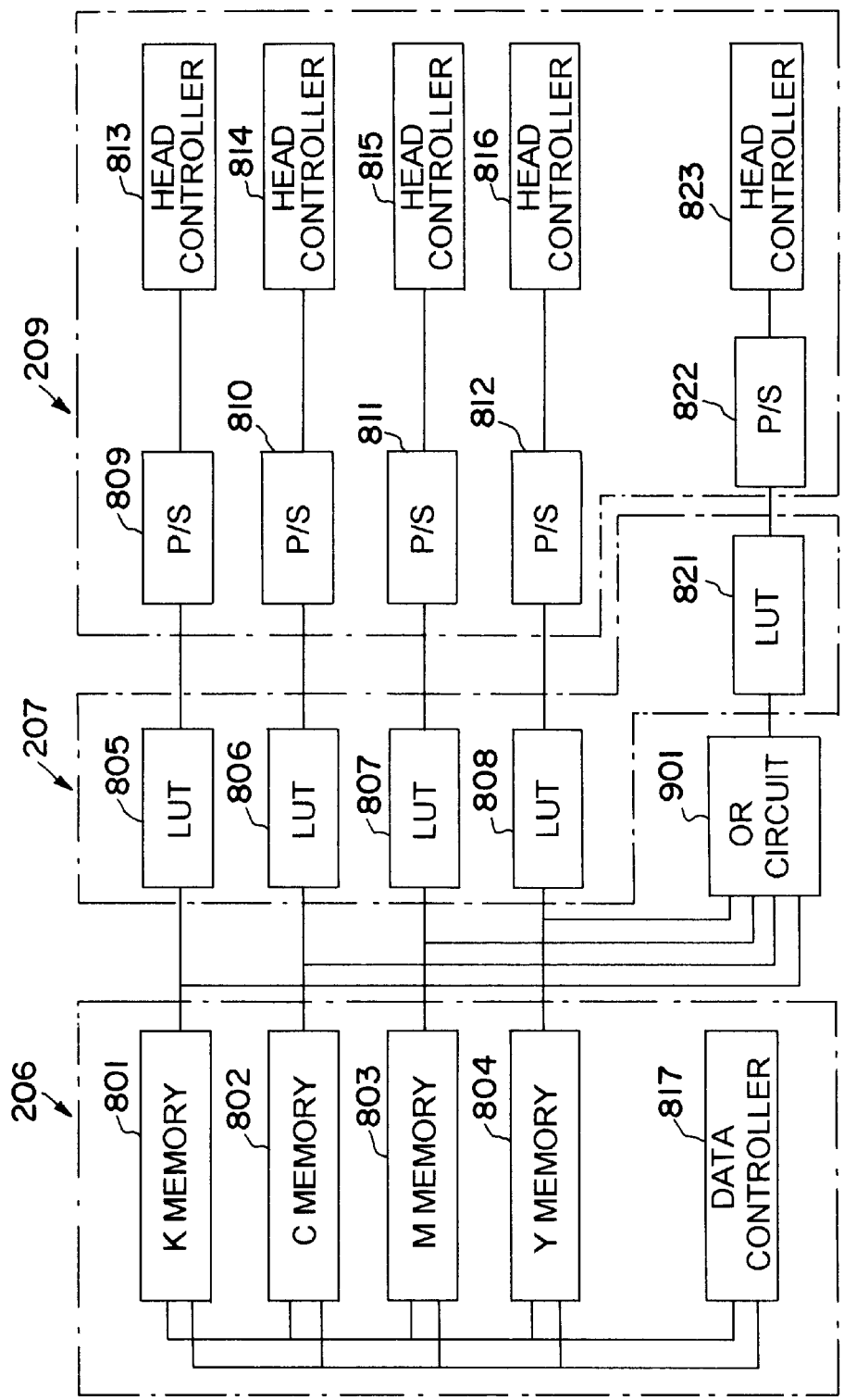
FIG. 8 is a block diagram of a data processing portion in the second embodiment of the present invention.
Figure 9:
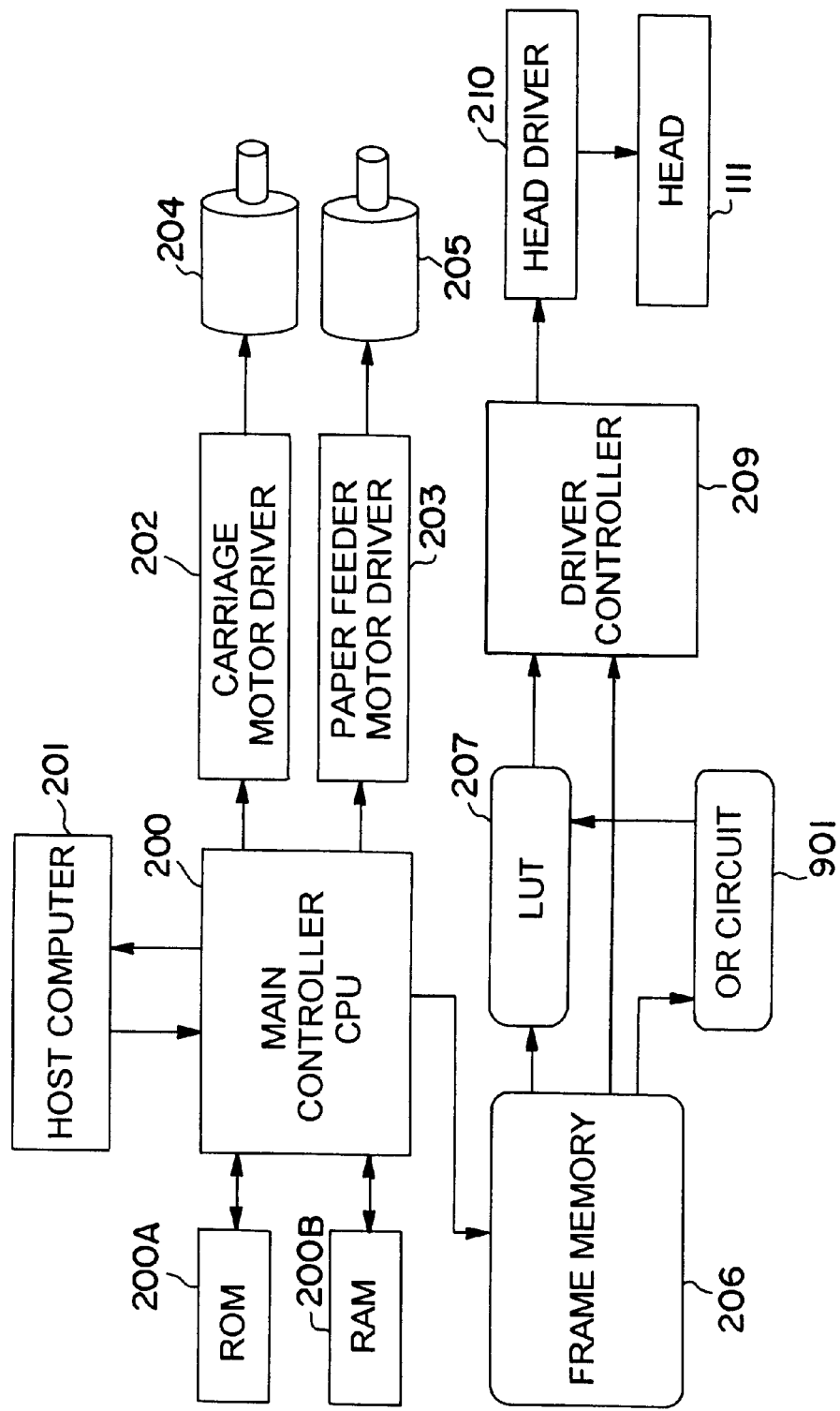
FIG. 9 is a block diagram of a control system in the second embodiment of the present invention.

FIG. 9 is a block diagram showing a control system similarly to FIG. 2 of the first embodiment. Like components to those in FIG. 2 will be identified by like reference numerals and are neglected from detailed discussion for avoiding redundant discussion to keep the disclosure simple enough for facilitating clear understanding of the invention. FIG. 8 is a detailed block diagram of the frame memory 206, the LUT 207, an OR circuit 901 and the driver controller 209. FIG. 11 is an explanatory illustration showing a process content of a LUT 821 employed for generating the driving data of the processing liquid ejecting head 105. The LUT 821 is added for the construction of the foregoing first embodiment. In the shown embodiment, the resolution of each of the heads 101 to 105 is 600 DPI both in the primary scanning direction and the auxiliary scanning direction similarly to the first embodiment. The printing data stored in the frame memory 206 is 2 bit data of 300 DPI. Namely, the data in the frame memory 206 is an index data encoded at 300 DPI.

At first, the printing operation will be briefly discussed with reference to FIG. 9.

In FIG. 9, in the LUT 207, a LUT for the processing liquid corresponding to the processing liquid ejecting head 105 in the head assembly 111, is set separately from the LUT corresponding to the printing heads 101 to 104. Namely, respectively independent LUTs are used corresponding to the index data for the printing heads and the data for the processing liquid. The reference numeral 901 denotes the OR gate for calculating the logical sum of the four image data for black, cyan, magenta and yellow inks, as discussed later. The OR circuit 901 of the shown embodiment is set for directly performing calculation of the logical sum of the index data of 300 DPI from the frame memory 206. After completion of calculation of the logical sum of four color image data with maintaining data format as 2 bit data of 300 DPI, the result of calculation is transferred to the LUT for the processing liquid of the LUT 207.

The 2 bit printing data (index data) of 300 DPI which is transferred from the host computer 201 is stored in the frame memory 206. The printing data stored in the frame memory 206 has a data amount corresponding to a data amount for printing in one primary scan of the head assembly 111. After accumulation of the printing data for one primary scan, the CPU 200 drives the carriage motor 204 via the carriage motor driver 202. By revolution of the carriage motor 204, the head assembly 111 is driven for movement in the primary scanning direction. Then, depending upon the scanning positions of respective printing heads 101 to 104 on the printing medium 7, the LUT 207 reads out the printing data sequentially from the frame memory 206 to perform the LUT process set forth above. On the basis of resultant high resolution image data, inks are ejected through ejection openings of the printing heads 101 to 104 for forming the printing dots D1. Once printing in one primary scan is completed, the CPU 200 drives the paper feeder motor 205 via the paper feeder motor driver 203 for feeding the printing medium 7 line in the auxiliary scanning direction. Printing medium 7 is fed in an amount equal to the printing width of one line. Thereafter, the head assembly 111 performs next primary scan. By repeating the foregoing operations, printing is performed per one line for the printing surface 7A of the printing medium, such as the printing paper or so forth.

On the other hand, in the printing operation during primary scan of the head assembly 111; the printing data for respective printing heads 101 to 104 are read out in real time from the frame memory 206 in the similar manner to that of the former embodiment and transferred to the printing heads 101 to 104 respectively with conversion into high resolution image data. Also, separately form the foregoing process, depending upon the scanning position of the processing liquid ejecting head 105, four color image data for respective ink colors are read out in real time from the frame memory 206. Then, the four color image data is input to the OR gate 901 as two bits low resolution image data at 300 DPI. Then, the logical sum of these image data is calculated.

The calculation method will be discussed later. The resultant image data of calculation of the logical sum of the four color image data is decoded as high resolution data for the processing liquid corresponding to resolution of 600 DPI of the processing liquid ejecting head 105. Here, the processing liquid ejecting head 105 has the same resolution to the printing heads 101 to 104. Then, on the basis of the high resolution data for the processing liquid decoded into 600 DPI, the processing liquid ejecting head 105 is controlled driving.

Next, with reference to FIG. 8, the printing operation will be discussed in greater detail. In the discussion given hereinafter, the scanning positions of respective heads 101 to 105 on the printing medium 7 are assumed to be the similar position to those of FIG. 3 set forth above.

In FIG. 8, the reference numerals 801 to 804 denote data memory in the frame memory 206, in which the 2 bit low resolution printing data for black, cyan, magenta and yellow inks at 300 DPI are accumulated. On the other hand, the reference numerals 805 to 808 denote LUTs corresponding to respective printing data for black, cyan, magenta and yellow to perform LUT process set forth above. In FIGS. 4A to 4D, the printing data for one ink color is shown exemplarily. Needless to say, the printing data may be differentiated for respective ink colors. The reference numerals 809 to 812 denote parallel-to-serial converters corresponding to respective printing data for black, cyan, magenta and yellow inks. These parallel-to-serial converters 809 to 812 converts respective parallel printing data for ink colors into serial data for facilitating transfer to respective printing heads 101 to 104. The reference numerals 813 to 816 denote head controllers for the printing heads 101 to 104 for respective black, cyan, magenta and yellow inks. The reference numeral 817 denotes a data controller set for transferring respective printing data in the frame memory 206 in synchronism with movement of the carriage 2. The reference numeral 821 denotes a LUT for the data for the processing liquid constructed similarly to those of 805 to 808. The reference numeral 822 denotes a parallel-to-serial converter of the data for the processing liquid, which converts the parallel data for the processing liquid to the serial data for facilitating transfer to the processing liquid ejecting head 105. The reference numeral 823 denotes a head controller for the processing liquid ejecting head 105.

Upon printing of the image, in the scanning positions of respective heads 101 to 105 in FIG. 3, the data controller 817 reads out 2 bit low resolution printing data 321 of 300 DPI for the black ink printing head 101 from the data memory 801. The printing data 321 is then transferred to the LUT 805 for the black ink and converted into the high resolution printing data corresponding to resolution of 600 DPI for the printing head 101. The high resolution printing data is converted into the serial data in the parallel-to-serial converter 809. On the basis of the serial data, the black ink printing head 101 is controlled driving via the head controller 813. Next, the data controller 817 reads out 2 bit low resolution printing data 322 of 300 DPI for the cyan ink printing head 102 from the data memory 802. The printing data 322 is then transferred to the LUT 806 for the cyan ink and converted into the high resolution printing data corresponding to resolution of 600 DPI for the printing head 102. The high resolution printing data is converted into the serial data in the parallel-to-serial converter 810. On the basis of the serial data, the cyan ink printing head 102 is controlled driving via the head controller 814. Similarly, the printing data 323 and 324 corresponding to magenta and yellow printing heads 103 and 104 are read out from the data memories 83 and 804, and converted into high resolution printing data and further converted into the serial data. On the basis of these data, the printing heads 103 and 104 are controlled driving.

The driving data of the processing liquid ejecting head 105 is generated in the following manner. At first, the data controller 817 reads out the printing data 311 for the black ink corresponding to the position of the processing liquid ejecting head 105 of FIG. 3 from the black ink data memory 801. Next, read out printing data 311 is transferred to the OR circuit 901. The printing data 311 is then temporarily stored as 2 bit low resolution printing data of 300 DPI. Next, the data controller 817 reads out the printing data 312 for the cyan ink corresponding to the position of the processing liquid ejecting head 105 of FIG. 3 from the cyan ink data memory 802. Then, read out printing data 312 is transferred to the OR circuit 901. In the OR circuit 901, the logical sum of the preliminarily stored 2 bit printing data 311 of 300 DPI for the black ink and the 2 bit printing data 312 of 300 DPI for the cyan ink. Next, the data controller 817 reads out the printing data 313 for the magenta ink corresponding to the position of the processing liquid ejecting head 105 of FIG. 3 from the magenta ink data memory 803. Then, read out printing data 313 is transferred to the OR circuit 901. In the OR circuit 901, the logical sum of the preliminarily calculated logical sum of printing data 311 and 312 and the 2 bit printing data 313 of 300 DPI for the magenta ink. Next, the data controller 817 reads out the printing data 314 for the yellow ink corresponding to the position of the processing liquid ejecting head 105 of FIG. 3 from the yellow ink data memory 804. Then, read out printing data 314 is transferred to the OR circuit 901. In the OR circuit 901, the logical sum of the preliminarily calculated logical sum of the printing data 311, 312 and 313 and the 2 bit printing data 314 of 300 DPI for the yellow ink. As set forth above, the logical sum of 2 bit printing data of 300 DPI for four colors can be calculated.

The logical sum of 2 bit printing data of 300 DPI calculated as set forth above, is transferred to the LUT 821 for the processing liquid data to be converted into the high resolution data of 600 DPI. Thereafter, by the parallel-to-serial converter 822, the high resolution data is converted into the serial data. Then, on the basis of the serial data, the head controller 823 controls driving of the processing liquid ejecting head 105.

As set forth above, upon generation of the driving data for the processing liquid ejecting head 105, after calculation of the logical sum of the low resolution printing data for four colors by the OR circuit 901, one time of LUT process is performed with respect to the result of calculation by the LUT 821. Accordingly, LUT processes for the heads 101 to 105 can be required for five times. Lesser LUT processes requires lesser data processing period during printing operation. Therefore, even when number of the ejection openings in respective heads 101 to 105 is increased, no problem will be arisen.

Next, concrete example of the driving data of the processing liquid ejecting head 105 will be discussed with reference to FIGS. 10, 11 and 12.

Figure 10:
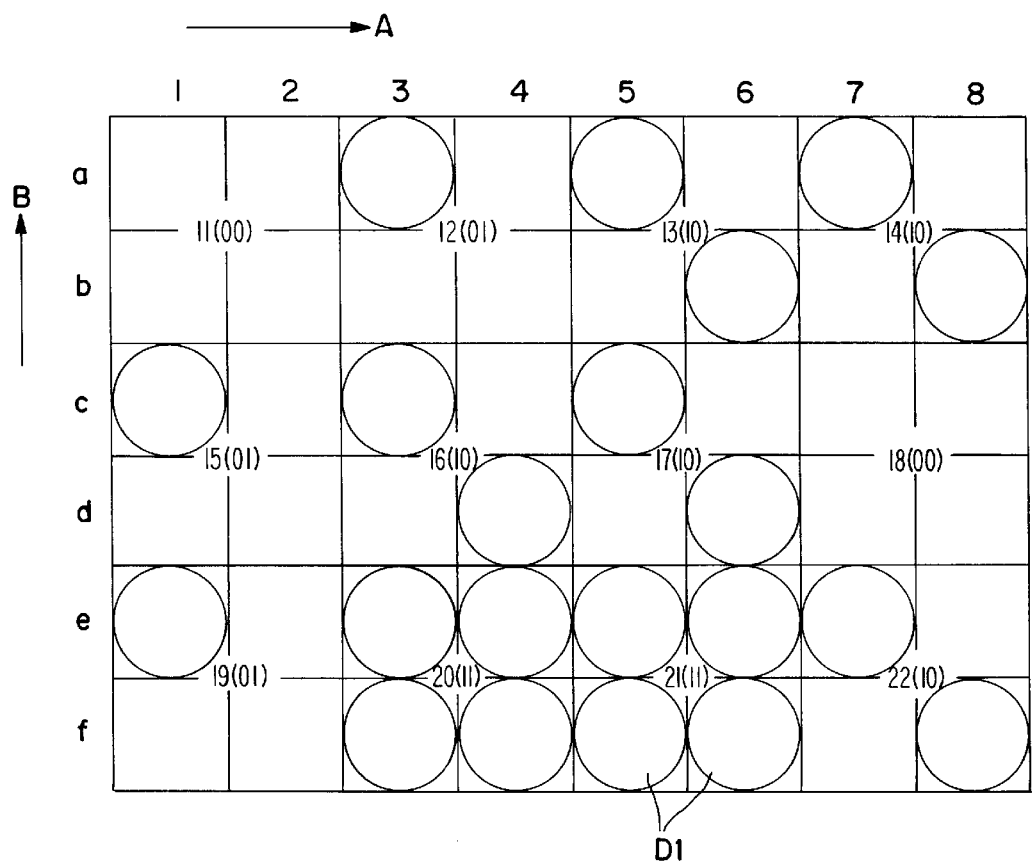
FIG. 10 is an explanatory illustration showing an example of a printing dot formed by a head of FIG. 9.

At first, FIG. 10 shows data after calculation of the logical sum in the OR circuit 901. In FIG. 10, one □ corresponds to one pixel of 1/600"×1/600" on the printing medium 7. Accordingly, four □ on the printing medium 7 forms the size of 1/300"×1/300". One of the 2 bit printing data of 300 DPI in the frame memory 206 corresponds to four □. In the parenthesis ( ) in FIG. 10, data (2 bit) after calculation of the logical sum of the OR circuit 901 with respect to four pixels corresponding to four □ is shown. The pixels 11, 12, 13 . . . of 300 DPI respectively corresponding to four pixels and data (2 bit) after calculation of the logical sum are as follows.

The data after calculation of the logical sum with respect to the pixel 11 of 300 DPI (coordinates of 600 DPI are (1, a), (1, b), (2, a) and (2, b)) is (00). Similarly, the pixel 12 is (01), the pixel 13 is (10), the pixel 14 is (10), the pixel 15 is (01), the pixel 16 is (10), the pixel 17 is (10), the pixel 18 is (00), the pixel 19 is (01), the pixel 20 is (11), the pixel 21 is (11), the pixel 22 is (10). On the other hand, in FIG. 10, the portion of ○ means that the ink is ejected.

FIGS. 11A to 11D are explanatory illustration showing content of process of the LUT 821. Namely, the LUT 821 inputs 2 bit data (00), (01), (10) and (11) of 300 DPI and converts into high resolution data of 600 DPI. In FIGS. 11A to 11D, there are illustrated ejection pattern as the content of data after conversion of the input data (00), (01), (10) and (11). Black dots represent ejection of the processing liquid.

Figure 12:
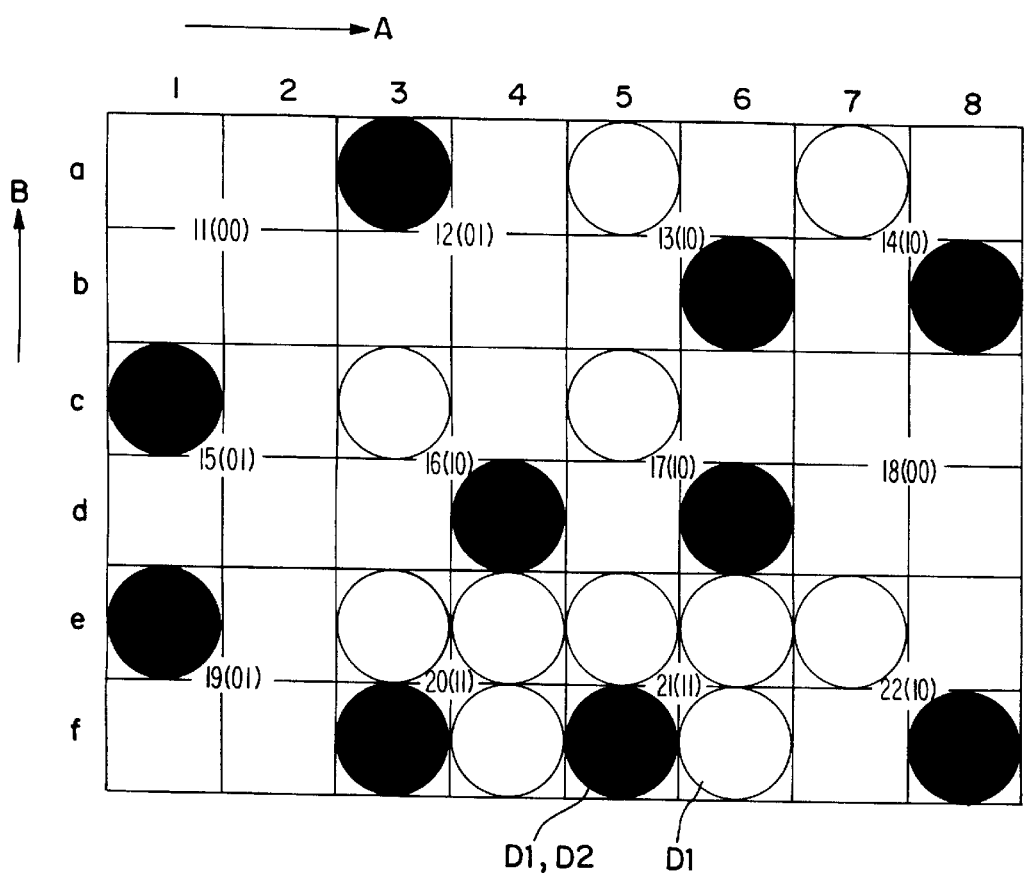
FIG. 12 is an explanatory illustration showing an example of a processing liquid dot formed by the head of FIG. 9.

FIG. 12 is an explanatory illustration showing a result of the LUT process of FIGS. 11A to 11D with respect to the logical sum data (00), (01), (10), (11) of the pixel of 300 DPI shown in FIG. 10. For example, since the logical sum data of the pixel 12 of 300 DPI in FIG. 10 is (01), the processing liquid is ejected to the pixel of 600 DPI at the coordinates (3, a) in FIG. 12 by the LUT process of FIG. 11B. On the other hand, since the logical sum data of the pixel 20 of 300 DPI is (11), the processing liquid is ejected to the pixel of 600 DPI at the coordinates (3, f) in FIG. 12 by the LUT process of FIG. 11D.

On the other hand, similarly to the LUTs 805 to 808 for the printing heads 101 to 104, the LUT 821 for the processing liquid ejecting head 105 can be re-written. Also, the content of the LUT process in the LUT 821 may be variable depending upon printing modes or kind of the printing medium 7, in printing or so forth for varying the ejecting condition of the processing liquid.

Also, while the foregoing first and second embodiment of the present invention are illustrated and described for the case where the driving data for the processing liquid ejecting head 105 and the driving data for the printing heads 101 to 104 are the same high resolution, it may be possible to differentiate the resolution. For example, it may be possible to set the resolution of the former (the driving data for the processing liquid ejecting head 104) to be slightly lower than that of the latter (the driving data for the printing heads 101 to 104).

Here, as an example, the treatment liquid or solution for making ink dyestuff insoluble can be obtained in the following manner.

Specifically, after the following components are mixed together and dissolved, and the mixture is pressure-filtered by using a membrane filter of 0.22 μm in pore size (tradename: fuloropore filter manufactured by Sumitomo Electric Industries, Ltd.), and thereafter, pH of the mixture is adjusted to a level of 4.8 by adding sodium hydroxide whereby liquid A1 can be obtained.

[Components of A1]

low molecular weight ingredients of cationic compound;
　　　stearyl-trimethyl ammonium salts
　　　(tradename: Electrostriper QE, manufactured by Kao Corporation), or
　　　stearyl-trimethyl ammonium chloride (tradename: Yutamine 86P, manufactured by Kao Corporation)

2.0 parts by weight high molecular weight ingredients of cationic compound;

copolymer of diarylamine hydrochloride and sulfur dioxide(having an average molecular weight of 5000)

(tradename: polyaminesulfon PAS-92, manufactured by Nitto Boseki Co., Ltd.)

3.0 parts by weight thiodiglycol; 10 parts by weight water balance

Preferable examples of ink which becomes insoluble by mixing the aforementioned treatment liquid can be noted below.

Specifically, the following components are mixed together, the resultant mixture is pressure-filtered with the use of a membrane filter of 0.22 $\mu$m in pore size (tradename: Fuloroporefilter, manufactured by Sumitomo Electric Industries, Ltd.) so that yellow ink Y1, magenta ink M1, cyan ink C1 and black ink K1 can be obtained.

Y1

C. I. direct yellow 142 2 parts by weight thiodiglycol 10 parts by weight acetynol EH (tradename: manufactured by Kawaken Fine Chemical Co., Ltd.) 0.05 parts by weight water balance

M1 having the same composition as that of Y1 other than that the dyestuff is changed to 2.5 parts by weight of C. I. acid red 289.

C1 having the same composition as that of Y1 other than that the dyestuff is changed to 2.5 parts by weight of acid blue 9.

K1 having the same composition as that of Y1 other than that the dyestuff is changed to 3 parts by weight of C. I. food black 2.

According to the present invention, the aforementioned treatment liquid and ink are mixed with each other at the position on the printing medium or at the position where they penetrate in the printing medium. As a result, the ingredient having a low molecular weight or cationic oligomer among the cationic material contained in the treatment liquid and the water soluble dye used in the ink having anionic radical are associated with each other by an ionic mutual function as a first stage of reaction whereby they are instantaneously separated from the solution liquid phase.

Next, since the associated material of the dyestuff and the cationic material having a low molecular weight or cationic oligomer are adsorbed by the ingredient having a high molecular weight contained in the treatment liquid as a second stage of reaction, a size of the aggregated material of the dyestuff caused by the association is further increased, causing the aggregated material to hardly enter fibers of the printed material. As a result, only the liquid portion separated from the solid portion permeates into the printed paper, whereby both high print quality and a quick fixing property are obtained. At the same time, the aggregated material formed by the ingredient having a low molecular weight or the cationic oligomer of the cationic material and the anionic dye by way of the aforementioned mechanism, has increased viscosity. Thus, since the aggregated material does not move as the liquid medium moves, ink dots adjacent to each other are formed by inks each having a different color at the time of forming a full colored image but they are not mixed with each other. Consequently, a malfunction such as bleeding does not occur. Furthermore, since the aggregated material is substantially water-insoluble, water resistibility of a formed image is complete. In addition, light resistibility of the formed image can be improved by the shielding effect of polymer.

By the way, the term "insoluble" or "aggregation" refers to observable events in only the above first stage or in both the first and second stages.

When the present invention is carried out, since there is no need of using the cationic material having a high molecular weight and polyvalent metallic salts like the prior art or even though there is need of using them, it is sufficient that they are assistantly used to improve an effect of the present invention, a quantity of usage of them can be minimized. As a result, the fact that there is no reduction of a property of color exhibition that is a problem in the case that an effect of water resistibility is asked for by using the conventional cationic high molecular weight material and the polyvalent metallic salts can be noted as another effect of the present invention.

With respect to a printing medium usable for carrying out the present invention, there is no specific restriction, so called plain paper such as copying paper, bond paper or the like conventionally used can preferably be used. Of course, coated paper specially prepared for ink jet printing and OHP transparent film are preferably used. In addition, ordinary high quality paper and bright coated paper can preferably be used.

Ink usable for carrying out the present invention should not be limited only to dyestuff ink, and pigment ink having pigment dispersed therein can also be used. Any type of treatment liquid can be used, provided that pigment is aggregated with it. The following pigment ink can be noted as an example of pigment ink adapted to cause aggregation by mixing with the treatment liquid A1 previously discussed. As mentioned below, yellow ink Y2, magenta ink M2, cyan ink C2 and black ink K2 each containing pigment and anionic compound can be obtained.

[Black Ink K2]

The following materials are poured in a batch type vertical sand mill (manufactured by Aimex Co.), glass beads each having a diameter of 1 mm is filled as media using anion based high molecular weight material P-1 (aqueous solution containing a solid ingredient of styrene methacrylic acid ethylacrylate of 20% having an acid value of 400 and average molecular weight of 6000, neutralizing agent: potassium hydroxide) as dispersing agent to conduct dispersion treatment for three hours while water-cooling the sand mill. After completion of dispersion, the resultant mixture has a viscosity of 9 cps and pH of 10.0. The dispersing liquid is poured in a centrifugal separator to remove coarse particles, and a carbon black dispersing element having a weight-average grain size of 10 nm is produced.

(Composition of Carbon Black Dispersing Element)

P-1 aqueous solution (solid ingredient of 20%) 40 parts carbon black Mogul L (tradename: manufactured by Cablack Co.) 24 parts glycerin 15 parts ethylene glycol monobutyl ether 0.5 parts isopropyl alcohol 3 parts water 135 parts Next, the thus obtained dispersing element is sufficiently dispersed in water, and black ink K2 containing pigment for ink jet printing is obtained. The final product has a solid ingredient of about 10%.

[Yellow Ink Y2]

Anionic high molecular P-2 (aqueous solution containing a solid ingredient of 20% of stylenacrlylic acid methyl methaacrylate having an acid value of 280 and an average molecular weight of 11,000, neutralizing agent: diethanolamine) is used as a dispersing agent and dispersive treatment is conducted in the same manner as production of the black ink K2 whereby yellow color dispersing element having a weight-average grain size of 103 nm is produced.

(Composition of Yellow Dispersing Element)

- P-2 aqueous solution (having a solid ingredient of 20%) 35 parts
- C. I. pigment yellow 180 (tradename: Nobapalm yellow PH-G, manufactured by Hoechst Aktiengesellschaft Co.) 24 parts
- triethylen glycol 10 parts
- diethylenglycol 10 parts
- ethylene glycol monobutylether 1.0 parts
- isopropyl alcohol 0.5 parts
- water 135 parts The thus obtained yellow dispersing element is sufficiently dispersed in water to obtain yellow ink Y2 for ink jet printing and having pigment contained therein. The final product of ink contains a solid ingredient of about 10%.

[Cyan Ink C2]

Cyan colored-dispersant element having a weight-average grain size of 120 nm is produced using anionic high molecular P-1 as dispersing agent, and moreover, using the following materials by conducting dispersing treatment in the same manner as the carbon black dispersing element.

(Composition of Cyan Colored-dispersing Element)

- P-1 aqueous solution (having solid ingredient of 20%) 30 parts
- C. I. pigment blue 153 (tradename: Fastogen blue FGF, manufactured by Dainippon Ink And Chemicals, Inc.) 24 parts
- glycerin 15 parts
- diethylenglycol monobutylether 0.5 parts
- isopropyl alcohol 3 parts
- water 135 parts The thus obtained cyan colored dispersing element is sufficiently stirred to obtain cyan ink C2 for ink jet printing and having pigment contained therein. The final product of ink has a solid ingredient of about 9.6%.

[Magenta Ink M2]

Magenta color dispersing element having a weight-average grain size of 115 nm is produced by using the anionic high molecular P-1 used when producing the black ink X2 as dispersing agent, and moreover, using the following materials in the same manner as that in the case of the carbon black dispersing agent.

(Composition of the Magenta Colored Dispersing Element)

- P-1 aqueous solution (having a solid ingredient of 20%) 20 parts
- C. I. pigment red 122 (manufactured by Dainippon Ink And Chemicals, Inc.) 24 parts
- glycerin 15 parts
- isopropyl alcohol 3 parts
- water 135 parts Magenta ink M2 for ink jet printing and having pigment contained therein is obtained by sufficiently dispersing the magenta colored dispersing element in water. The final product of ink has a solid ingredient of about 9.2%.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof are disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head Examples of the preliminary auxiliary system are a preliminary heating means utilizing electrothermal transducers or a combination of other heater elements and the electrothermal transducers, and a means for carrying out preliminary ejection of ink independently of the ejection for recording; These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective so when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention

What is claimed is:

1. An ink-jet printing apparatus using a printing head which can eject ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, comprising:

storage means for storing low resolution printing data corresponding to the printing head;

converting means for converting the stored low resolution printing data into high resolution printing data having a resolution higher than that of the stored low resolution printing data;

first control means for effecting ejection of the ink from the printing head on the basis of the converted high resolution printing data;

liquid ejection data generating means for generating high resolution liquid ejection data corresponding to the liquid ejecting head by thinning the high resolution printing data; and second control means for effecting ejection of the liquid from the liquid ejecting head on the basis of the high resolution liquid ejection data, wherein the high resolution printing data used by said first control means for effecting ejection of the ink is not thinned.

2. An ink-jet printing apparatus as claimed in claim 1, wherein said liquid ejection data generating means generates the high resolution liquid ejection data by masking the high resolution printing data according to a predetermined pattern.

3. An ink-jet printing apparatus as claimed in claim 1, wherein the printing head comprises a plurality of printing heads ejecting different inks, said converting means converts the low resolution printing data corresponding to respective ones of the plurality of printing heads into the high resolution printing data, and said liquid ejection data generating means generates the high resolution liquid ejection data by thinning a logical sum of high resolution printing data per each of the plurality of printing heads.

4. An ink-jet printing apparatus as claimed in claim 1, wherein the printing head comprises a plurality of printing heads ejecting different inks, said converting means coverts the low resolution printing data corresponding to each of the plurality of printing heads into respective high resolution data, and said liquid ejection data generating means generates the high resolution liquid ejection data by calculating the logical sum of printing data after thinning of high resolution printing data per each of the plurality of printing heads.

5. An ink-jet printing apparatus as claimed in claim 1, which further comprises:

moving means for moving the printing head and the liquid ejecting head in a primary scanning direction; and feeding means for feeding the printing medium in an auxiliary scanning direction substantially perpendicular to the primary scanning direction.

6. An ink-jet printing apparatus as claimed in claim 1, wherein said second control means causes the liquid dot to be formed at a position on the printing medium where the printing dot is to be formed, before or after formation of the printing dot.

7. An ink-jet printing apparatus as claimed in claim 1, wherein the ink contains an anionic dye, and the liquid contains a cationic material of low molecular weight and a cationic material of high molecular weight where the cationic material of high molecular weight is higher than the cationic material of low molecular weight.

8. An ink-jet printing apparatus as claimed in claim 1, wherein the ink contains an anionic pigment or at least an anionic compound and a pigment, and the liquid contains cationic material of low molecular weight and a cationic material of high molecular weight where the cationic material of high molecular weight is higher than the cationic material of low molecular weight.

9. An ink-jet printing apparatus as claimed in claim 1, wherein the printing head and the liquid ejecting head utilize thermal energy so as to eject the ink and the liquid, respectively.

10. An ink-jet printing apparatus as claimed in claim 1, wherein the printing head and the liquid ejecting head have electrothermal transducers causing film boiling for ejecting the ink and the liquid so that the printing head and the liquid ejecting head can eject the ink and the liquid, respectively.

11. An ink-jet printing apparatus as claimed in claim 1, wherein the low resolution printing data is multi-value data of at least two values representative of multiple tone levels for printing, and the high resolution printing data is binary data representative of presence and absence of the printing dot.

12. An ink-jet printing apparatus using a printing head which can eject ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, comprising:
  storage means for storing low resolution printing data corresponding to the printing head;
  first converting means for converting the stored low resolution printing data into high resolution printing data having a resolution higher than that of the low resolution printing data;
  first control means for effecting ejection of the ink from the printing head on the basis of the converted high resolution printing data;
  second converting means for converting the stored low resolution printing data into high resolution liquid ejection data corresponding to the liquid ejecting head; and
  second control means for effecting ejection of the liquid from the liquid ejecting head on the basis of the high resolution liquid ejection data.

13. An ink-jet printing apparatus as claimed in claim 12, wherein said second converting means converts the low resolution printing data into the high resolution liquid ejection data for the liquid ejecting head in a form of thinned high resolution printing data.

14. An ink-jet printing apparatus as claimed in claim 12, wherein the printing head comprises a plurality of printing heads ejecting different inks, said first converting means converts the low resolution printing data corresponding to each of the plurality of printing heads into the high resolution printing data, and said second converting means converts a logical sum of the low resolution printing data per each of the plurality of printing heads into the high resolution liquid ejection data.

15. An ink-jet printing apparatus as claimed in claim 12, which further comprises:
  moving means for moving the printing head and the liquid ejecting head in a primary scanning direction; and
  feeding means for feeding the printing medium in an auxiliary scanning direction substantially perpendicular to the primary scanning direction.

16. An ink-jet printing apparatus as claimed in claim 12, wherein said second control means causes the liquid dot to be formed at a position on the printing medium where the printing dot is to be formed, before or after formation of the printing dot.

17. An ink-jet printing apparatus as claimed in claim 12, wherein the ink contains an anionic dye, and the liquid contains a cationic material of low molecular weight and a cationic material of high molecular weight where the cationic material of high molecular weight is higher than the cationic material low molecular weight.

18. An ink-jet printing apparatus as claimed in claim 12, wherein the ink contains an anionic pigment or at least an anionic compound and a pigment, and the liquid contains a cationic material of low molecular weight and a cationic material of high molecular weight where the cationic material of high molecular weight is higher than the cationic material of low molecular weight.

19. An ink-jet printing apparatus as claimed in claim 12, wherein the printing head and the liquid ejecting head utilize thermal energy so as to eject the ink and the liquid, respectively.

20. An ink-jet printing apparatus as claimed in claim 12, wherein the printing head and the liquid ejecting head have electrothermal transducers causing film boiling for ejecting the ink and the liquid so that the printing head and the liquid ejecting head can eject the ink and the liquid, respectively.

21. An ink-jet printing apparatus as claimed in claim 12, wherein the low resolution printing data is multi-value data of at least two values representative of multiple tone levels for printing, and the high resolution printing data is binary data representative of presence and absence of the printing dot.

22. An ink-jet printing method for a printing apparatus using a printing head which can eject ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, the printing apparatus having a storage medium, the ink-jet printing method comprising the steps of:
  storing low resolution printing data corresponding to the printing head in the storage medium;
  converting the stored low resolution printing data into high resolution printing data having a resolution higher than that of the low resolution printing data;
  effecting ejection of the ink from the printing head on the basis of the converted high resolution printing data;
  generating high resolution liquid ejection data corresponding to the liquid ejecting head by thinning the high resolution printing data; and
  effecting ejection of the liquid from the liquid ejecting head on the basis of the high resolution liquid ejection data,
  wherein the high resolution printing data used for effecting ejection of the ink is not thinned.

23. An ink-jet printing method as claimed in claim 22, wherein the printing head and the liquid ejecting head utilize thermal energy so as to eject the ink and the liquid, respectively.

24. An ink-jet printing method as claimed in claim 22, wherein the printing head and the liquid ejecting head have electrothermal transducers causing film boiling for ejecting the ink and the liquid so that the printing head and the liquid ejecting head can eject the ink and the liquid, respectively.

25. An ink-jet printing method as claimed in claim 22, wherein the low resolution printing data is multi-value data of at least two values representative of multiple tone levels for printing, and the high resolution printing data is binary data representative of presence and absence of the printing dot.

26. An ink-jet printing method for a printing apparatus using a printing head which can eject ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, the printing apparatus having a storage medium, the ink-jet printing method comprising the steps of:

storing low resolution printing data corresponding to the printing head in the storage medium;

converting the stored low resolution printing data into high resolution printing data having a resolution higher than that of the low resolution printing data;

effecting ejection of the ink from the printing head on the basis of the converted high resolution printing data;

converting the stored low resolution printing data into high resolution liquid ejection data corresponding to the liquid ejecting head; and effecting ejection of the liquid from the liquid ejecting head on the basis of the high resolution liquid ejection data.

27. An ink-jet printing method as claimed in claim 26, wherein the low resolution printing data is converted into the high resolution liquid ejection data for the liquid ejecting head in a form of thinned high resolution printing data.

28. An ink-jet printing method as claimed in claim 26, wherein the printing head and the liquid ejecting head utilize thermal energy so as to eject the ink and the liquid, respectively.

29. An ink-jet printing method as claimed in claim 26, wherein the printing head and the liquid ejecting head have electrothermal transducers causing film boiling for ejecting the ink and the liquid so that the printing head and the liquid ejecting head can eject the ink and the liquid, respectively.

30. An ink-jet printing method as claimed in claim 26, wherein the low resolution printing data is multi-value data of at least two values representative of multiple tone levels for printing, and the high resolution printing data is binary data representative of presence and absence of the printing dot.

31. An ink-jet printing method for a printing apparatus using a printing head which can eject ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, the printing apparatus having a storage medium, the ink-jet printing method comprising the steps of:

storing low resolution printing data corresponding to the printing head in the storage medium;

converting the stored low resolution printing data into high resolution printing data having a resolution higher than that of the low resolution printing data;

effecting ejection of the ink from the printing head on the basis of the converted high resolution printing data;

generating high resolution liquid ejection data corresponding to the liquid ejecting head by thinning the high resolution printing data; and effecting ejection of the liquid from the liquid ejecting head on the basis of the high resolution liquid ejection data, wherein the high resolution printing data corresponds to a capacity of actual printing resolution of the printing head, and the high resolution liquid ejection data corresponds to a capacity of actual liquid ejection resolution of the liquid ejection head, and wherein the high resolution printing data used for effecting ejection of the ink is not thinned.

32. An ink-jet printing method as claimed in claim 31, wherein the low resolution printing data is multi-value data of at least two values representative of multiple tone levels for printing, and the high resolution printing data is binary data representative of presence and absence of the printing dot.

33. An ink-jet printing method for a printing appartus using a printing head which can eject ink and a liquid ejecting head which can eject a liquid acting to make a coloring material in the ink insoluble or coagulating the same, for forming a printing dot on a printing medium by the ink ejected from the printing head and forming a liquid dot on the printing medium by the liquid ejected from the liquid ejecting head, the printing apparatus having a storage medium, the ink-jet printing method comprising the steps of:

storing low resolution printing data corresponding to the printing head in the storage medium;

converting the stored low resolution printing data into high resolution printing data having a resolution higher than that of the low resolution printing data;

effecting ejection of the ink from the printing head on the basis of the converted high resolution printing data;

converting the stored low resolution printing data into high resolution liquid ejection data corresponding to the liquid ejecting head; and effecting ejection of the liquid from the liquid ejecting head on the basis of the high resolution liquid ejection data, wherein the high resolution printing data corresponds to a capacity of actual printing resolution of the printing head, and the high resolution liquid ejection data corresponds to a capacity of actual liquid ejecting resolution of the liquid ejecting head.

34. An ink-jet printing method as claimed in claim 33, wherein the low resolution printing data is multi-value data of at least two values representative of multiple tone levels for printing, and the high resolution printing data is binary data representative of presence and absence of the printing dot.

* * * * *

UNITED STATES PATENT AND TRADEMARK OFFICE
CERTIFICATE OF CORRECTION

PATENT NO. : 6,585,363 B1
DATED : July 1, 2003
INVENTOR(S) : Hideki Tanaka et al.

It is certified that error appears in the above-identified patent and that said Letters Patent is hereby corrected as shown below:

Column 6,
Line 21, "and a to f" should read -- and rows a to f --.

Column 9,
Line 56, "111;" should read -- 111, --; and
Line 61, "form" should read -- from --.

Column 11,
Line 1, "83" should read -- 803 --.

Column 12,
Line 58, "fuloropore" should read -- fluoropore --.

Column 13,
Line 20, "Fuloroporefilter," should read -- Fluoropore filter, --.

Column 15,
Line 5, "stylenacrlylic" should read -- stylenacrylic --.

Column 18,
Line 39, "coverts" should read -- converts --.

Column 20,
Line 6, "low" should read -- of low --.

Column 22,
Line 22, "appartus' should read -- apparatus --.

Signed and Sealed this

Second Day of December, 2003

JAMES E. ROGAN
*Director of the United States Patent and Trademark Office*